(12) United States Patent
Badesha et al.

(10) Patent No.: US 6,678,495 B1
(45) Date of Patent: Jan. 13, 2004

(54) EPOXY SILANE CURED FLUOROPOLYMERS

(75) Inventors: Santokh S. Badesha, Pittsford, NY (US); George J. Heeks, Rochester, NY (US); Robert M. Ferguson, Penfield, NY (US); David J. Gervasi, West Henrietta, NY (US); Arnold W. Henry, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/416,148

(22) Filed: Oct. 11, 1999

(51) Int. Cl.[7] .................. B32B 27/30; G03G 13/04; G03G 13/20; G03G 15/20
(52) U.S. Cl. .................. 399/320; 399/333; 430/48; 430/124; 428/335; 428/421
(58) Field of Search .................. 428/421, 422, 428/335, 906; 399/310, 353, 320; 430/48, 124; 429/36.8, 36.91

(56) References Cited

U.S. PATENT DOCUMENTS

| 4,257,699 A | 3/1981 | Lentz | 355/3 FU |
|---|---|---|---|
| 4,339,553 A | 7/1982 | Yashimura et al. | 524/544 |
| 4,395,462 A * | 7/1983 | Polmanteer | 428/420 |
| 4,989,046 A * | 1/1991 | Matsuo | 355/279 |
| 5,017,432 A | 5/1991 | Eddy et al. | 428/422 |
| 5,049,444 A * | 9/1991 | Bingham et al. | 428/339 |
| 5,153,657 A * | 10/1992 | Yu et al. | 355/299 |
| 5,166,031 A | 11/1992 | Badesha et al. | 430/124 |
| 5,219,612 A | 6/1993 | Bingham et al. | 427/194 |
| 5,281,506 A | 1/1994 | Badesha et al. | 430/124 |
| 5,337,129 A | 8/1994 | Badesha | 355/275 |
| 5,366,772 A | 11/1994 | Badesha et al. | 428/35.8 |
| 5,370,931 A | 12/1994 | Fratangelo et al. | 428/334 |
| 5,456,987 A | 10/1995 | Badesha | 428/421 |
| 5,547,759 A | 8/1996 | Chen et al. | 428/421 |
| 5,736,250 A | 4/1998 | Heeks et al. | 428/447 |
| 6,096,429 A * | 8/2000 | Chen et al. | 428/421 |

FOREIGN PATENT DOCUMENTS

| EP | 0018140 | 3/1980 |
| WO | WO 98/16875 | 4/1998 |

* cited by examiner

*Primary Examiner*—Ramsey Zacharia
(74) *Attorney, Agent, or Firm*—Judith L. Byorick

(57) ABSTRACT

Disclosed is a fuser member comprising a substrate and at least one layer thereover, said layer comprising a crosslinked product of a composition which comprises (a) a fluoroelastomer, and (b) an epoxy silane curative.

27 Claims, 4 Drawing Sheets

EPOXY SILANE CURED FLUOROPOLYMERS

BACKGROUND OF THE INVENTION

The present invention is directed to crosslinked fluoropolymer materials. More specifically, the present invention is directed to crosslinked fluoropolymer materials suitable for applications such as fuser member coatings for imaging processes and the like. One embodiment of the present invention is directed to a fuser member comprising a substrate and at least one layer thereover, said layer comprising a crosslinked product of a composition which comprises (a) a fluoroelastomer, and (b) an epoxy silane curative.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which can be the photosensitive member itself, or some other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner to be bonded firmly to the support.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat can be applied by heating one or both of the rolls, plate members, or belt members. Fusing of the toner particles occurs when the proper combination of heat, pressure, and/or contact for the optimum time period are provided. The balancing of these variables to bring about the fusing of the toner particles is well known in the art, and can be adjusted to suit particular machines or process conditions.

During the operation of one fusing system in which heat is applied to cause thermal fusing of the toner particles onto a support, both the toner image and the support are passed through a nip formed between a pair of rolls, plates, belts, or combination thereof. The concurrent transfer of heat and the application of pressure in the nip effects the fusing of the toner image onto the support. It is important in the fusing process that minimal or no offset of the toner particles from the support to the fuser member takes place during normal operations. Toner particles offset onto the fuser member can subsequently transfer to other parts of the machine or onto the support in subsequent copying cycles, thereby increasing the image background, causing inadequate copy quality, causing inferior marks on the copy, or otherwise interfering with the material being copied there as well as causing toner contamination of other parts of the machine. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release properties of the fuser member, and accordingly it is desirable to provide a fusing surface having a low surface energy to provide the necessary release.

To ensure and maintain good release properties of the fuser member, it has become customary to apply release agents to the fuser member during the fusing operation. Typically, these materials are applied as thin films of, for example, silicone oils, such as polydimethyl siloxane, or substituted silicone oils, such as amino-substituted oils, mercapto-substituted oils, or the like, to prevent toner offset. In addition, fillers can be added to the outer layers of fuser members to increase the bonding of the fuser oil to the surface of the fuser member, thereby imparting improved release properties.

The use of polymeric release agents having functional groups which interact with a fuser member to form a thermally stable, renewable self-cleaning layer having good release properties for electroscopic thermoplastic resin toners, is described in, for example, U.S. Pat. Nos. 4,029,827, 4,101,686, and 4,185,140, the disclosures of each of which are totally incorporated herein by reference. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

It is important to select the correct combination of fuser surface material, any filler incorporated or contained therein, and fuser oil. Specifically, it is important that the outer layer of the fuser member react sufficiently with the selected fuser oil to obtain sufficient release. To improve the bonding of fuser oils with the outer surface of the fuser member, fillers have been incorporated into or added to the outer surface layer of the fuser members. The use of a filler can aid in decreasing the amount of fusing oil necessary by promoting sufficient bonding of the fuser oil to the outer surface layer of the fusing member. It is important, however, that the filler not degrade the physical properties of the outer layer of the fuser member, and it is also important that the filler not cause too much of an increase in the surface energy of the outer layer.

Fillers are also sometimes added to the outer layers of fuser members to increase the thermal conductivity thereof. Examples of such fillers include conductive carbon, carbon black, graphite, aluminum oxide, titanium, and the like, as well as mixtures thereof. Efforts have been made to decrease the use of energy by providing a fuser member which has excellent thermal conductivity, thereby reducing the temperature needed to promote fusion of toner to paper. This increase in thermal conductivity also allows for increased speed of the fusing process by reducing the amount of time needed to heat the fuser member sufficiently to promote fusing. Efforts have also been made to increase the toughness of the fuser member layers to increase abrasion resistance and, accordingly, the life of the fuser member.

With regard to known fuser coatings, silicone rubber has been the preferred outer layer for fuser members in electrostatographic machines. Silicone rubbers interact well with various types of fuser release agents. Fluorocarbon polymers such as perfluoroalkoxypolytetrafluoroethylene (PFA Teflon®), however, which is frequently used as an outer coating for fuser members, is more durable and abrasion resistant than silicone rubber coatings. Also, the surface energy for PFA Teflon® is lower than that of silicone rubber coatings.

U.S. Pat. No. 4,257,699 (Lentz), the disclosure of which is totally incorporated herein by reference, discloses a fuser member, fuser assembly, and method of fusing or fixing thermoplastic resin powder images to a substrate in a fuser assembly of the type wherein a polymeric release agent having functional groups is applied to the surface of the fuser member. The fuser member comprises a base member having at least two layers of elastomer thereon, at least the outer layer elastomer surface having a metal-containing filler therein. Exemplary of such a fuser member is an aluminum base member coated with a first layer of poly (vinylidene fluoride-hexafluoropropylene) copolymer optionally having a metal-containing filler, such as lead oxide, dispersed therein, and at least a second layer of poly(vinylidene fluoride-hexafluoropropylene) copolymer having metal-containing filler, such as lead oxide, dispersed therein, coated upon the first layer.

U.S. Pat. No. 4,339,553 (Yoshimura et al.), the disclosure of which is totally incorporated herein by reference, discloses a water-based fluoroelastomer coating composition improved in adhesiveness onto a substrate, which comprises (A) an aqueous fluoroelastomer dispersion blended with (B) an aminosilane compound of the formula

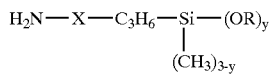

wherein R is methyl or ethyl, X is a single bond,

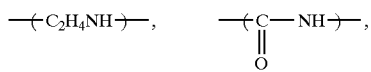

or

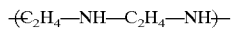

and y is an integer of 2 or 3 and optionally with (C) an amine compound having at least one terminal amino group directly bonded to an aliphatic hydrocarbon residue.

U.S. Pat. No. 5,017,432 (Eddy et al.), the disclosure of which is totally incorporated herein by reference, discloses a fuser member and fuser system of a type wherein a polymeric release agent having functional groups supplied to the surface of the fuser member has an elastomer fusing surface comprising poly(vinylidene fluoride-hexafluoropropylene-tetrafluoroethylene), wherein the vinylidene fluoride is present in an amount less than 40 mole percent, a metal oxide is present in amounts sufficient to interact with the polymer release agent having functional groups to provide an interfacial barrier layer between the fusing surface and the toner and being substantially unreactive with the elastomer, and wherein the elastomer is cured from a solvent solution thereof with a nucleophilic curing agent soluble in the solution and in the presence of less than 4 parts by weight of inorganic base per 100 parts by weight of polymer, with the inorganic base being effective at least partially to dehydrofluorinate the vinylidene fluoride.

U.S. Pat. No. 5,166,031 (Badesha et al.), the disclosure of which is totally incorporated herein by reference, discloses a fuser member comprising a supporting substrate having an outer layer of a volume grafted elastomer which is a substantially uniform integral interpenetrating network of a hybrid composition of a fluoroelastomer and a polyorganosiloxane, the volume graft having been formed by dehydrofluorination of the fluoroelastomer by a nucleophilic dehydrofluorinating agent, followed by addition polymerization by the addition of an alkene or alkyne functionally terminated polyorganosiloxane and a polymerization initiator.

U.S. Pat. No. 5,337,129 (Badesha), the disclosure of which is totally incorporated herein by reference, discloses an intermediate toner transfer component comprising a substrate and a coating comprising integral, interpenetrating networks of haloelastomer, silicon oxide, and optionally polyorganosiloxane.

U.S. Pat. No. 5,366,772 (Badesha et al.), the disclosure of which is totally incorporated herein by reference, discloses a fuser member comprising a supporting substrate and an outer layer comprising an integral interpenetrating hybrid polymeric network which comprises a haloelastomer, a coupling agent, a functional polyorganosiloxane, and a crosslinking agent.

U.S. Pat. No. 5,370,931 (Fratangelo et al.), the disclosure of which is totally incorporated herein by reference, discloses a fuser member which comprises a supporting substrate comprising an outer layer of a volume grafted elastomer which is a substantially uniform integral interpenetrating network of a hybrid composition of a fluoroelastomer and a polyorganosiloxane, the volume graft having been formed by dehydrofluorination of the fluoroelastomer by a nucleophilic dehydrofluorinating agent, followed by addition polymerization by the addition of an alkene or alkyne functionally terminated polyorganosiloxane and a polymerization initiator, wherein the outer layer contains a reactive metal oxide in an amount of from about 2 to about 7 weight percent.

U.S. Pat. No. 5,456,987 (Badesha), the disclosure of which is totally incorporated herein by reference, discloses an intermediate toner transfer component comprising a substrate and a coating comprising integral, interpenetrating networks of haloelastomer, titanium oxide, and optionally polyorganosiloxane.

U.S. Pat. No. 5,736,250 (Heeks et al.), the disclosure of which is totally incorporated herein by reference, discloses crosslinked fluorocarbon elastomer surfaces comprising a fluorocarbon elastomer and an amino siloxane, and also discloses a method for providing a crosslinked fluorocarbon elastomer surface on a fuser member supporting substrate which includes mixing together an acid acceptor, an emulsifier, water, and amino siloxane with a latex fluorocarbon elastomer.

Copending application U.S. Ser. No. 09/416,149, filed concurrently herewith, entitled "Fuser Member Coating Composition and Processes for Providing Elastomeric Surfaces Thereon," with the named inventors Santokh S. Badesha, Clifford O. Eddy, David J. Gervasi, George J. Heeks, and Arnold W. Henry, the disclosure of which is totally incorporated herein by reference, discloses fuser members and processes for fluorocarbon elastomer surfaces containing a fluorocarbon elastomer and a non-amino crosslinker together with methods for providing a crosslinked fluorocarbon elastomer surface on a fuser member supporting substrate which include mixing together an acid acceptor, an emulsifier, water, and a non-amino based crosslinker with a latex fluorocarbon elastomer.

Fluorocarbon elastormers, including those commercially available as, for example, VITON®, ALFAS®, FLUOREL®, TECHNOFLON®, DYNAMINE®, and the like, are used for a number of applications, including layers in fuser members, and are generally prepared from a variety of copolymers containing monomers such as vinylidene fluoride, hexafluoropropylene, chlorotrifluoroethylene, tetrafluoroethylene, perfluoro(methyl vinyl ether), ethylene, propylene, and the like. Some commercially available compositions are copolymers of these monomers, and contain small amounts of a bromine terminated olefin as a cure site monomer. These polymers are curable with dinucleophiles or peroxides. For example, VITON® GF, a common overcoat material for fuser members, can be cured with a bisphenol AF based curative (VC-50, available from E. I. DuPont de Nemours and Co). Present processes for fabrication of fuser coatings and other coatings containing fluoroelastomers generally contain a ball-milling step. The purpose of this ball-milling step is to reduce the particle size of the basic metal oxides often used for standard curing systems. In some situations, the particle size of these oxides may be insufficiently reduced to achieve a uniform coating free of surface defects.

Accordingly, while known compositions and processes are suitable for their intended purposes, a need remains for improved crosslinked fluoroelastomer materials. In addition, a need remains for improved methods for curing fluoroelastomer materials. Further, a need remains for methods for curing fluoroelastomers in the absence of particulate basic metal oxides. Additionally, a need remains for methods for curing fluoroelastomers that can employ lower curing temperatures than those presently used. There is also a need for crosslinked fluoroelastomer materials that have desirably high levels of heat stability. In addition, there is a need for crosslinked fluoroelastomer materials that have improved toughness characteristics. Further, there is a need for simplified methods for curing fluoroelastomers. Additionally, there is a need for crosslinked fluoroelastomer materials that need no additional adhesive when they are bound to surfaces such as silicones or other fluoroelastomers. A need also remains for crosslinked fluoroelastomer materials having pigment particles (such as those used to enhance electrical or thermal conductivity) well and uniformly dispersed therein.

SUMMARY OF THE INVENTION

The present invention is directed to a fuser member comprising a substrate and at least one layer thereover, said layer comprising a crosslinked product of a composition which comprises (a) a fluoroelastomer, and (b) an epoxy silane curative.

DETAILED DESCRIPTION OF THE INVENTION

Figure 1:
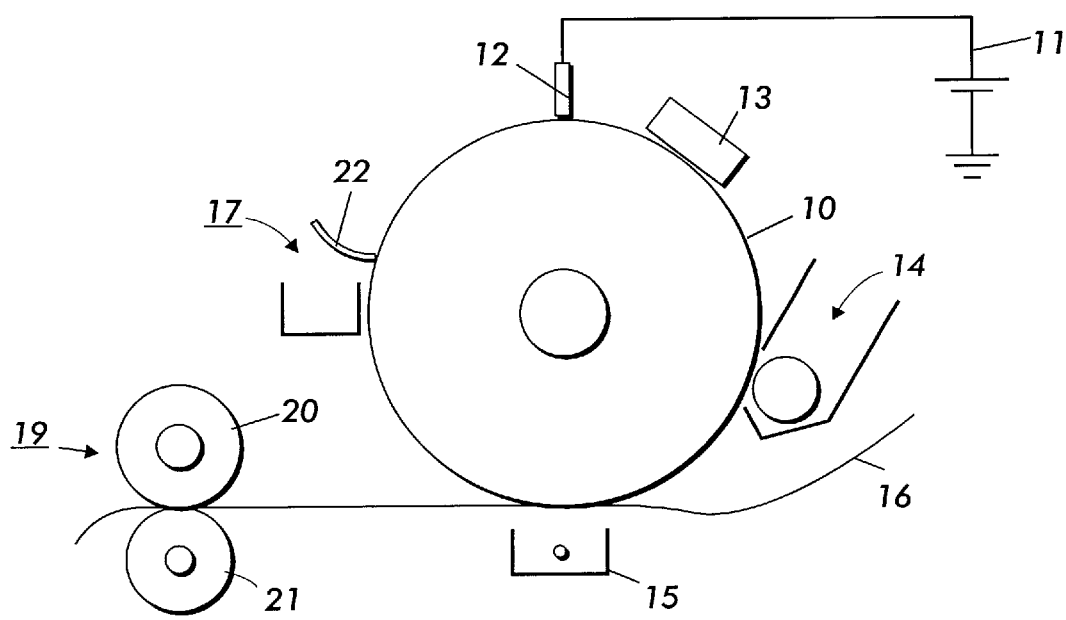
FIG. 1 is an illustration of a general electrostatographic apparatus.

Referring to FIG. 1, in a typical electrostatographic reproducing apparatus, a light image of an original to be copied is recorded in the form of an electrostatic latent image on a photosensitive member, and the latent image is subsequently rendered visible by the application of electroscopic thermoplastic resin particles, commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to a copy sheet 16 by transfer means 15, which can be pressure transfer, electrostatic transfer, or the like. Alternatively, the developed image can be transferred to an intermediate transfer member and subsequently transferred to a copy sheet.

After transfer of the developed image is completed, copy sheet 16 advances to fusing station 19, depicted in FIG. 1 as fusing and pressure rolls, wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
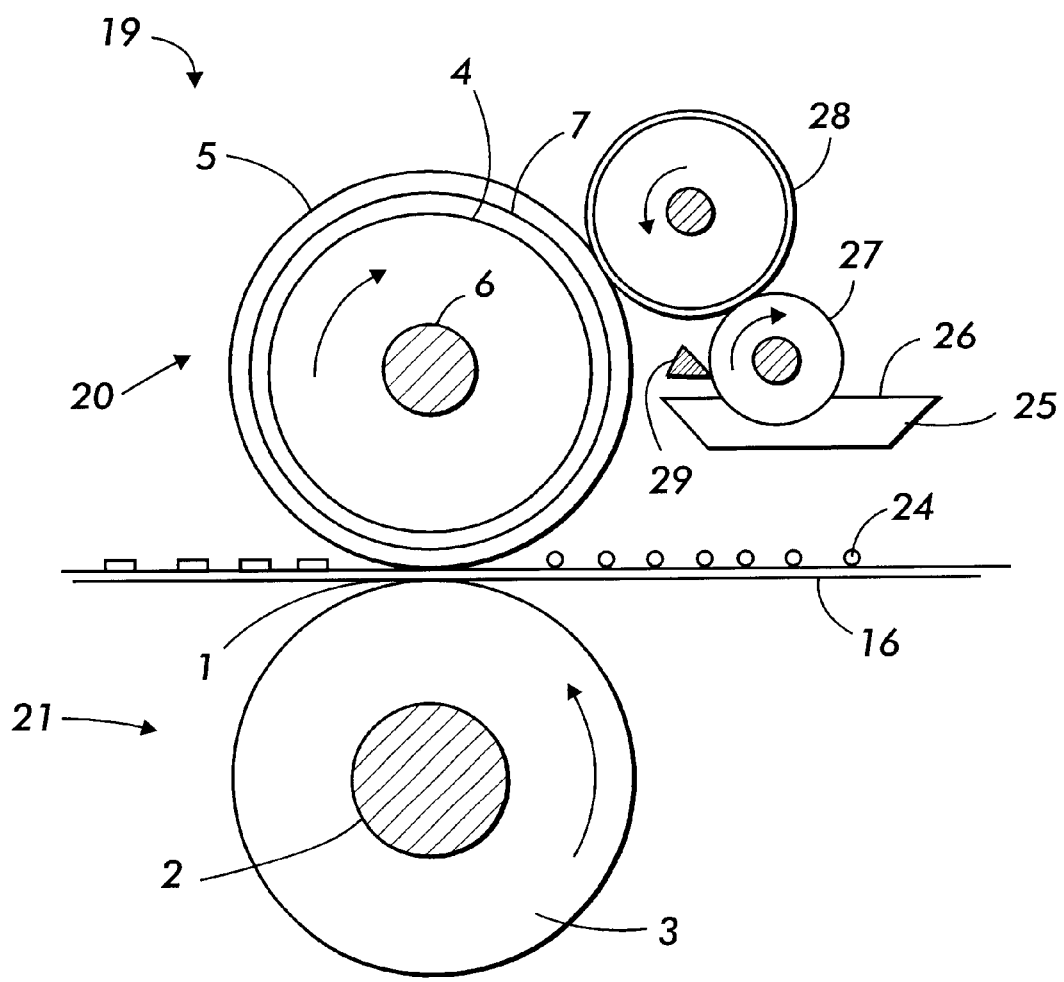
FIG. 2 illustrates a fusing system in accordance with an embodiment of the present invention.

Referring to FIG. 2, an embodiment of a fusing station 19 is depicted with an embodiment of a fuser roll 20 comprising crosslinked fluoroelastomer surface 5 on a suitable base member or substrate 4, which in this embodiment is a hollow cylinder or core fabricated from any suitable metal, such as aluminum, anodized aluminum, steel, nickel, copper, or the like, having a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact fluoroelastomer surface 5 of fuser roll 20. As shown in FIG. 2, an embodiment of a backup roll or pressure roll 21 is depicted as having a rigid steel core 2 with a polymer or elastomer surface or layer 3 thereon. Optional sump 25 contains optional polymeric release agent 26, which may be a solid or liquid at room temperature, but is a fluid at operating temperatures. The pressure member 21 can also optionally include a heating element (not shown).

In the embodiment shown in FIG. 2 for applying the polymeric release agent 26 to crosslinked fluoroelastomer surface 5, two release agent delivery rolls 27 and 28 rotatably mounted in the direction indicated are provided to transport release agent 26 to crosslinked fluoroelastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to crosslinked fluoroelastomer 5 in controlled thickness ranging from submicron thickness to thicknesses of several microns of release fluid. Thus, by metering device 29, preferably from about 0.1 to about 2 microns or greater thicknesses of release fluid can be applied to the surface of crosslinked fluoroelastomer 5.

Figure 3:
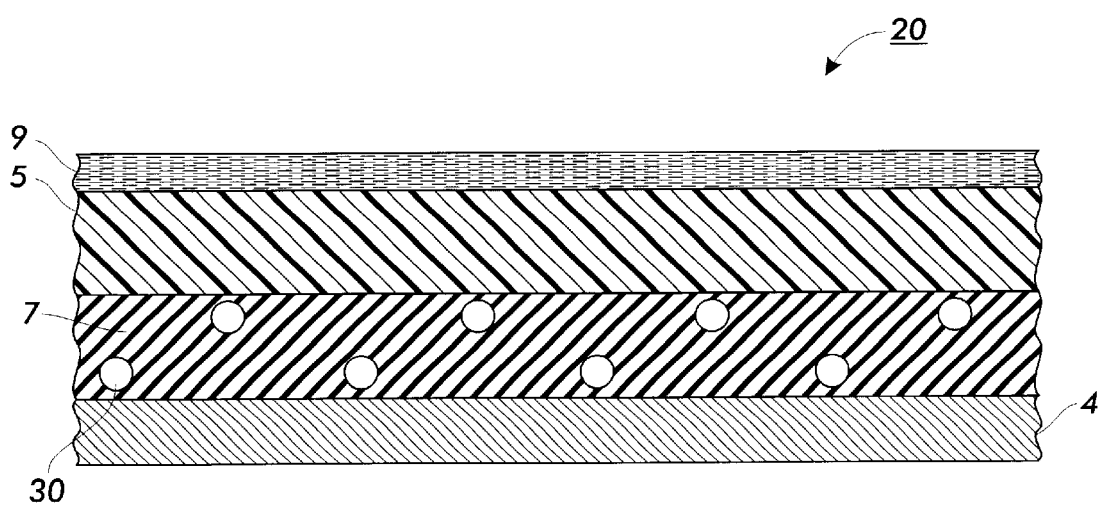
FIG. 3 demonstrates a cross-sectional view of an embodiment of the present invention.
Figure 4:
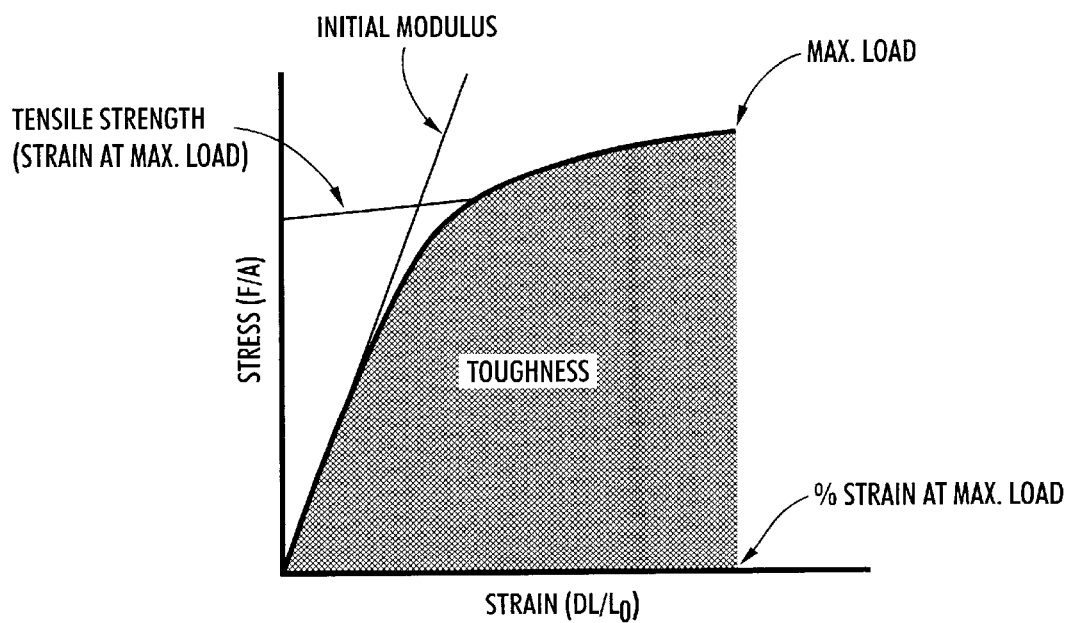
FIG. 4 represents a plot of data obtained in Example I which is a plot of stress (force divided by area; psi) versus strain (measured in terms of length change: $\Delta L/L_{initial}$).

FIG. 3 depicts a cross-sectional view of another embodiment of the invention, wherein fuser member 20 comprises substrate 4, optional intermediate surface layer 7 comprising silicone rubber and optional fillers 30, such as aluminum oxide or the like, dispersed or contained therein, and outer crosslinked fluoroelastomer surface layer 5. FIG. 3 also depicts fluid release agent or fusing oil layer 9.

The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser member of the present invention can be employed in a wide variety of machines, and is not specifically limited in its application to the particular embodiment depicted herein.

Any suitable substrate can be selected for the fuser member. The fuser member substrate can be a roll, belt, flat surface, sheet, film, or other suitable shape used in the fixing of thermoplastic toner images to a suitable copy substrate. It can take the form of a fuser member, a pressure member, or a release agent donor member, preferably in the form of a cylindrical roll. Typically, the fuser member is made of a hollow cylindrical metal core, such as copper, aluminum, stainless steel, or certain plastic materials chosen to maintain rigidity and structural integrity, as well as being capable of having a polymeric material coated thereon and adhered firmly thereto. It is preferred that the supporting substrate is a cylindrical sleeve, preferably with an outer polymeric layer of from about 1 to about 6 millimeters. In one embodiment, the core, which can be an aluminum or steel cylinder, is degreased with a solvent and cleaned with an abrasive cleaner prior to being primed with a primer, such as Dow Corning® 1200, which can be sprayed, brushed, or dipped, followed by air drying under ambient conditions for thirty minutes and then baked at 150° C. for 30 minutes.

Also suitable are quartz and glass substrates. The use of quartz or glass cores in fuser members allows for a light weight, low cost fuser system member to be produced. Moreover, the glass and quartz help allow for quick warm-up, and are therefore energy efficient. In addition, because the core of the fuser member comprises glass or quartz, there is a real possibility that such fuser members can be recycled. Moreover, these cores allow for high thermal efficiency by providing superior insulation.

When the fuser member is a belt, the substrate can be of any desired or suitable material, including plastics, such as Ultem®, available from General Electric, Ultrapek®, available from BASF, PPS (polyphenylene sulfide) sold under the tradenames Fortron®, available from Hoechst Celanese, Ryton R-4®, available from Phillips Petroleum, and Supec®, available from General Electric; PAI (polyamide imide), sold under the tradename Torlon® 7130, available from Amoco; polyketone (PK), sold under the tradename Kadel® E1230, available from Amoco; PI (polyimide); polyaramide; PEEK (polyether ether ketone), sold under the tradename PEEK 450GL30, available from Victrex; polyphthalamide sold under the tradename Amodel®, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar®), available from Amoco; and the like, as well as mixtures thereof. These plastics can be filled with glass or other minerals to enhance their mechanical strength without changing their thermal properties. In preferred embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide. Suitable materials also include silicone rubbers. Examples of belt-configuration fuser members are disclosed in, for example, U.S. Pat. Nos. 5,487,707, 5,514,436, and Copending application U.S. Ser. No. 08/297,203, filed Aug. 29, 1994, the disclosures of each of which are totally incorporated herein by reference. A method for manufacturing reinforced seamless belts is disclosed in, for example, U.S. Pat. No. 5,409,557, the disclosure of which is totally incorporated herein by reference.

The optional intermediate layer can be of any suitable or desired material. For example, the optional intermediate layer can comprise a silicone rubber of a thickness sufficient to form a conformable layer. Suitable silicone rubbers include room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC® 735 black RTV and SILASTIC® 732 RTV, both available from Dow Corning, and 106 RTV Silicone Rubber and 90 RTV Silicone Rubber, both available from General Electric. Other suitable silicone materials include the silanes, siloxanes (preferably polydimethylsiloxanes), such as fluorosilicones, dimethylsilicones, liquid silicone rubbers, such as vinyl crosslinked heat curable rubbers or silanol room temperature crosslinked materials, and the like. Other materials suitable for the intermediate layer include polyimides and fluoroelastomers, including those commonly used as fuser member outer layers. If desired, the intermediate layer can comprise a crosslinked fluoroelastomer according to the present invention.

Silicone rubber materials can swell during the fusing process, especially in the presence of a release agent. In the case of fusing color toner, normally a relatively larger amount of release agent is necessary to enhance release because of the need for a larger amount of color toner than is required for black and white copies and prints. Accordingly, the silicone rubber is more susceptible to swell in an apparatus using color toner. Aluminum oxide added in a relatively small amount can reduce the swell and increase the transmissibility of heat. This increase in heat transmissibility is preferred in fusing members useful in fusing color toners, since a higher temperature (for example, from about 155 to about 180° C.) is usually needed to fuse color toner, compared to the temperature required for fusing black and white toner (for example, from about 50 to about 180° C.).

Accordingly, optionally dispersed or contained in the intermediate silicone rubber layer is aluminum oxide in a relatively low amount of from about 0.05 to about 5 percent by volume, preferably from about 0.1 to about 5 percent by volume, and more preferably from about 2.2 to about 2.5 percent by total volume of the intermediate layer. In addition to the aluminum oxide, other metal oxides and/or metal hydroxides can be used. Such metal oxides and/or metal hydroxides include tin oxide, zinc oxide, calcium hydroxide, magnesium oxide, lead oxide, chromium oxide, copper oxide, and the like, as well as mixtures thereof. In a preferred embodiment, a metal oxide is present in an amount of from about 10 to about 50 percent by volume, preferably from about 20 to about 40 percent by volume, and more preferably from about 30 to about 35 percent by total volume of the intermediate layer. In a preferred embodiment copper oxide is used in these amounts in addition to the aluminum oxide. In preferred embodiments, the average particle diameter of the metal oxides such as aluminum oxide or copper oxide preferably is from about 1 to about 10 microns, and more preferably from about 3 to about 5 microns, although the average particle diameter can be outside of these ranges.

The optional intermediate layer typically has a thickness of from about 0.05 to about 10 millimeters, preferably from about 0.1 to about 5 millimeters, and more preferably from about 1 to about 3 millimeters, although the thickness can be outside of these ranges. More specifically, if the intermediate layer is present on a pressure member, it typically has a thickness of from about 0.05 to about 5 millimeters, preferably from about 0.1 to about 3 millimeters, and more preferably from about 0.5 to about 1 millimeter, although the thickness can be outside of these ranges. When present on a fuser member, the intermediate layer typically has a thickness of from about 1 to about 10 millimeters, preferably from about 2 to about 5 millimeters, and more preferably from about 2.5 to about 3 millimeters, although the thickness can be outside of these ranges. In a preferred embodiment, the thickness of the intermediate layer of the fuser member is higher than that of the pressure member, so that the fuser member is more deformable than the pressure member.

The outer fusing layer of the fuser member of the present invention comprises a crosslinked fluoroelastomer. This layer can be prepared by first preparing a liquid composition containing the uncrosslinked fluoroelastomer and a crosslinking agent according to the present invention as disclosed hereinbelow, as well as any desired optional fillers or other optional components. The liquid composition is applied to the substrate, followed by crosslinking of the fluoroelastomer, typically by heating to a temperature of from about 200 to about 400° F., although the temperature can be outside of this range, and typically for from about 10 to about 24 hours, although the time can be outside of this range, and although other crosslinking methods can also be employed.

Examples of suitable outer fusing layers of the fuser member include fluoroelastomers. Specifically, suitable fluoroelastomers are those described in, for example, U.S. Pat. Nos. 5,166,031, 5,281,506, 5,366,772, 5,370,931, 4,257,699, 5,017,432, and 5,061,965, the disclosures of each of which are totally incorporated herein by reference. These fluoroelastbmers, particularly from the class of copolymers, terpolymers, and tetrapolymers of vinylidene fluoride, hexafluoropropylene, and tetrafluoroethylene and a possible cure site monomer, are known commercially under various designations as VITON A®, VITON E®, VITON E60C®, VITON E430®, VITON 910®, VITON GH®, VITON GF®, VITON E45®, VITON A201C®, and VITON B50®. The VITON® designation is a trademark of E. I. Du Pont de Nemours, Inc. Other commercially available materials include FLUOREL 2170®, FLUOREL 2174®, FLUOREL 2176®, FLUOREL 2177®, FLUOREL 2123®, and FLUO-REL LVS 76®, FLUOREL® being a trademark of 3M Company. Additional commercially available materials include AFLAS®, a poly(propylene-tetrafluoroethylene), and FLUOREL II® (LII900), a poly(propylene-tetrafluoroethylenevinylidenefluoride) elastomer, both also available from 3M Company, as well as the TECNOFLONS® identified as FOR-60KIR®, FOR-LHF®, NM®, FOR-THF®, FOR-TFS®, TH®, and TN505®, available from Montedison Specialty Chemical Company. Fluoropolymer, and especially fluoroelastomer, materials such as the VITON® materials, are beneficial when used as fuser roll coatings at normal fusing temperatures (e.g., from about 50 to about 150° C.). These materials have the superior properties of high temperature stability, thermal conduction, wear resistance, and release oil swell resistance.

In another embodiment, the polymer is a fluoroelastomer having a relatively low quantity of vinylidene fluoride, such as in VITON GF®, available from E. I. DuPont de Nemours, Inc. The VITON GF® has 35 percent by weight of vinylidene fluoride, 34 percent by weight of hexafluoropropylene, and 29 percent by weight of tetrafluoroethylene, with 2 percent by weight cure site monomer. The cure site monomer can be those available from Du Pont, such as 4-bromoperfluorobutene-1,1,1-dihydro-4-bromoperfluorobutene-1, 3-bromoperfluoropropene-1,1,1-dihydro-3-bromoperfluoropropene-1, or any other suitable cure site monomer. The fluorine content of the VITON GF® is about 70 percent by weight by total weight of fluoroelastomer.

In yet another embodiment, the polymer is a fluoroelastomer having relatively low fluorine content such as VITON A201C®, which is a copolymer of vinylidene fluoride and hexafluoropropylene, having about 65 percent by weight fluorine content. This copolymer is compounded with crosslinkers and phosphonium compounds used as accelerators.

Particularly preferred for the present invention are the fluoroelastomers containing vinylidene fluoride, such as the VITON® materials. Most preferred are the vinylidene fluoride terpolymers such as VITON® GF.

It is preferred that the fluoroelastomer have a relatively high fluorine content of from about 65 to about 71 percent by weight, preferably from about 69 to about 70 percent by weight, and more preferably about 70 percent fluorine by weight of total fluoroelastomer. Less expensive elastomers, such as some containing about 65 percent by weight fluorine, can also be used.

In uncrosslinked polymers without cure site monomers, the relative amount of crosslinking sites such as vinylidene fluoride monomers in the polymer backbone affects the crosslink density and mechanical properties of the crosslinked polymer; accordingly, the relative amount of crosslinking sites in the polymer backbone can be selected depending on the desired physical properties and crosslink density of the crosslinked polymer. The literature available with commercially available fluoroelastomers such as the VITON® series provides extensive information regarding how varying relative amounts of monomers affects the performance objectives of the crosslinked material.

Other suitable fluoropolymers include those such as fluoroelastomer composite materials, which are hybrid polymers comprising at least two distinguishing polymer systems, blocks, or monomer segments, one monomer segment (hereinafter referred to as a "first monomer segment") that possesses a high wear resistance and high toughness, and the other monomer segment (hereinafter referred to as a "second monomer segment") that possesses low surface energy. The composite materials are hybrid or copolymer compositions comprising substantially uniform, integral, interpenetrating networks of a first monomer segment and a second monomer segment, and in some embodiments, optionally a third grafted segment, wherein both the structure and the composition of the segment networks are substantially uniform when viewed through different slices of the fuser member layer. The term "interpenetrating network" refers to the addition polymerization matrix wherein the polymer strands of the first monomer segment and the second monomer segment, as well as those of the optional third grafted segment, are intertwined in one another. A copolymer composition comprises a first monomer segment and a second monomer segment, as well as an optional third grafted segment, wherein the monomer segments are randomly arranged into a long chain molecule. Examples of polymers suitable for use as the first monomer segment or tough monomer segment include, for example, polyamides, polyimides, polysulfones, fluoroelastomers, and the like, as well as mixtures thereof. Examples of the low surface energy monomer segment or second monomer segment polymers include polyorganosiloxanes and the like, and also include intermediates that form inorganic networks. An intermediate is a precursor to inorganic oxide networks present in polymers described herein. This precursor goes through hydrolysis and condensation followed by the addition reactions to form desired network configurations of, for example, networks of metal oxides such as titanium dioxide, silicon oxide, zirconium oxide, and the like; networks of metal halides; and networks of metal hydroxides. Examples of intermediates include metal alkoxides, metal halides, metal hydroxides, and polyorganosiloxanes. The preferred intermediates are alkoxides, and particularly preferred are tetraethoxy orthosilicate for silicon oxide networks and titanium isobutoxide for titanium dioxide networks. In some embodiments, a third low surface energy monomer segment is a grafted monomer segment and, in preferred embodiments, is a polyorganosiloxane. In these preferred embodiments, it is particularly preferred that the second monomer segment is an intermediate to a network of metal oxide. Preferred intermediates include tetraethoxy orthosilicate for silicon oxide networks and titanium isobutoxide for titanium dioxide networks.

Also suitable are volume grafted elastomers. Volume grafted elastomers are a special form of hydrofluoroelastomer, and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in, for example, U.S. Pat. Nos. 5,166,031, 5,281,506, 5,366,772, and 5,370,931, the disclosures of each of which are totally incorporated herein by reference.

Examples of suitable polymer composites include volume grafted elastomers, titamers, grafted titamers, ceramers, grafted ceramers, and the like. Titamers and grafted titamers are disclosed in, for example, U.S. Pat. No. 5,486,987, the disclosure of which is totally incorporated herein by reference; ceramers and grafted ceramers are disclosed in, for example, U.S. Pat. No. 5,337,129, the disclosure of which is totally incorporated herein by reference; and volume grafted fluoroelastomers are disclosed in, for example, U.S. Pat. No. 5,366,772, the disclosure of which is totally incorporated herein by reference. In addition, these fluoroelastomer composite materials are disclosed in U.S. Pat. No. 5,778,290, the disclosure of which is totally incorporated herein by reference.

The fluoroelastomer is cured or crosslinked with an epoxy silane curative. Examples of suitable epoxy silane curatives include those of the formula

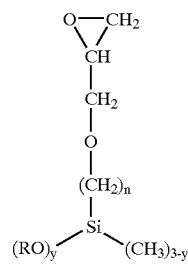

wherein y is an integer of 0, 1, 2, or 3 and R is an alkyl group, typically with from 1 to about 5 carbon atoms, although the number of carbon atoms can be outside of these ranges. One specific example of a suitable epoxy silane curative is glycidoxypropyl trimethoxysilane, of the formula

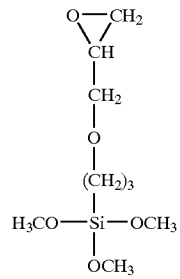

and is commercially available as, for example, DC Z 6040 from Dow Corning Co., Midland, Mich., as G6720 from United Chemical Technologies, and as SIG5840.0 from Gelest. Other suitable commercially available curatives include 3-glycidoxypropyl dimethylethoxysilane, of the formula

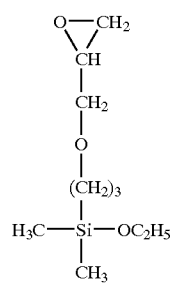

commercially available as, for example, UCT G6700 from United Chemical Technologies and as SIG5825.0 from Gelest, and (3-glycidoxypropyl)methyldiethoxysilane, of the formula

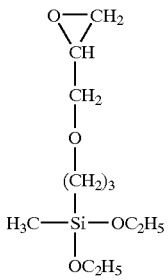

commercially available as, for example, G6710 from United Chemical Technologies and as SIG5832.0 from Gelest.

Optionally, the solution containing the curative and the fluoroelastomer can further contain an acid acceptor, which typically is an inorganic base. The acid acceptor dehydrofluorinates vinylidene fluoride in a polymer containing vinylidene fluoride monomer units, creating double bonds that act as reactive sites for crosslinking. Examples of suitable acid acceptors include magnesium oxide, calcium hydroxide, lead oxide, copper (III) oxide, zinc oxide, and the like, as well as mixtures thereof. Organic acid acceptors can also be employed, including amines and their Schiff base derivatives, such as diamines, aliphatic amines, aromatic amines, wherein the aromatic group can be (but is not limited to) benzene, toluene, naphthalene, anthracene, and the like, with specific examples of suitable amines or their Schiff base derivatives include N,N'-dicinnamylidene-1,6-hexanediamine (typically from about 2.5 to about 5 parts by weight per 100 hundred parts by weight fluoroelastomer), available under the tradename TECNOFLON® TECNOCIN-A®, hexamethylenediamine carbamate (typically from about 1 to about 3 parts by weight per 100 hundred parts by weight fluoroelastomer), available under the tradename TECNOFLON® TECNOCIN-B®, triethylene tetramine or TETA (typically from about 1 to about 3 parts by weight per 100 hundred parts by weight fluoroelastomer), and the like, as well as mixtures thereof. The inorganic acid acceptor typically is added to the fluoroelastomer solution in an amount of from about 2 to about 20 parts by weight per 100 hundred parts by weight fluoroelastomer, and preferably from about 8 to about 15 parts by weight per 100 hundred parts by weight fluoroelastomer, although the relative amounts can be outside of these ranges. The amine as the acid acceptor typically is added to the fluoroelastomer solution in an amount of from about 0.5 to about 5 parts by weight per 100 hundred parts by weight fluoroelastomer, and preferably from about 1 to about 3 parts by weight per 100 hundred parts by weight fluoroelastomer, although the relative amounts can be outside of these ranges.

The curative is added to the fluoroelastomer prior to coating the fluoroelastomer onto the substrate. The fluoroelastomer is dissolved or dispersed in a solvent, such as methyl ethyl ketone, methyl isobutyl ketone, toluene, butyl acetate, amyl acetate, mixtures thereof, or the like. The curative is added to the fluoroelastomer in any desired or effective amount, typically from about 0.5 to about 15 percent by weight of the fluoroelastomer, preferably from about 2.5 to about 10 percent by weight of the fluoroelastomer, and more preferably from about 4 to about 7 percent by weight of the fluoroelastomer, although the relative amounts can be outside of these ranges. The fluoroelastomer can be dissolved or dispersed in the solvent in any desired or effective amount, typically from about 5 to about 30 percent by weight of the fluoroelastomer/solvent solution, preferably from about 10 to about 25 percent by weight of the fluoroelastomer/solvent solution, and more preferably from about 15 to about 20 percent by weight of the fluoroelastomer/solvent solution, although the amount can be outside of these ranges. While not required, it is preferred to add the curative to the solution last, thereby enabling adequate mixing, grinding (if additional optional fillers are present in the solution), and dissolution of the polymer prior to the crosslinking reaction. Subsequent to coating the fluoroelastomer/curative mixture onto the substrate, the coating is dried by any desired or suitable means, such as simple exposure to ambient air or the like. Thereafter, the fluoroelastomer is cured by exposure to heat, typically at from about 200 to about 400° F., preferably at from about 250 to about 350° F., and more preferably at from about 250 to about 300° F., although the temperature can be outside of these ranges, and typically for from about 10 to about 24 hours, preferably from about 12 to about 20 hours, and more preferably from about 14 to about 16 hours, although the time can be outside of these ranges. While drying is not required, the drying step is preferred to improve film characteristics of the crosslinked polymer. In addition, while not preferred, drying can occur simultaneously with curing, and curing can be by other methods, such as exposure to ultraviolet, infrared, or e-beam radiation, or the like.

Optionally, conductive fillers can be dispersed in the outer fusing layer of the fuser member, particularly in embodiments wherein a functional fuser oil is used. Preferred fillers are capable of interacting with the functional groups of the release agent to form a thermally stable film which releases the thermoplastic resin toner and prevents the toner from contacting the filler surface material itself. This bonding enables a reduction in the amount of oil needed to promote release. Further, preferred fillers promote bonding with the oil without causing problems such as scumming or gelling. In addition, it is preferred that the fillers be substantially non-reactive with the outer polymer material so that no adverse reaction occurs between the polymer material and the filler which would hinder curing or otherwise negatively affect the strength properties of the outer surface material. Fillers in the outer fusing layer can also increase thermal conductivity.

Other optional adjuvants and fillers can be incorporated in the crosslinked fluoroelastomer of the outer fusing layer according to the present invention, provided that they do not affect the integrity of the crosslinked fluoroelastomer. Such fillers normally encountered in the compounding of elastomers include coloring agents, reinforcing fillers, processing aids, accelerators, and the like. Oxides, such as magnesium oxide, and hydroxides, such as calcium hydroxide, are sometimes added to fluoroelastomers. Proton acids, such as stearic acid, are suitable additives in EPDM and BR polymer formulations to improve release by improving bonding of amino oils to the elastomer composition. Other metal oxides, such as cupric oxide and/or zinc oxide, can also be used to improve release. Metal oxides, such as copper oxide, aluminum oxide, magnesium oxide, tin oxide, titanium dioxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a fluoropolymer outer fusing layer can increase release of toner from the fuser member during and following the fusing process. Processability of a fluoropolymer outer fusing layer can be increased by increasing absorption of silicone oils, in particular by adding fillers such as fumed silica or clays such as organo-montmorillonites. Inorganic particulate fillers can increase the abrasion resistance of the polymeric outer fusing layer. Examples of such fillers include metal-containing fillers, such as a metal, metal alloy, metal oxide, metal salt, or other metal compound; the general classes of suitable metals include those metals of Groups 1b, 2a, 2b, 3a, 3b, 4a, 4b, 5a, 5b, 6b, 7b, 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

The polymer layers of the fuser member can be coated on the fuser member substrate by any desired or suitable means, including injection molding, normal spraying, dipping, and tumble spraying techniques. A flow coating apparatus as described in Copending application U.S. Ser. No. 08/672,493 filed Jun. 26, 1996, entitled "Flow Coating Process for Manufacture of Polymeric Printer Roll and Belt Components," the disclosure of which is totally incorporated herein by reference, can also be used to flow coat a series of fuser rolls. It is preferred that the polymers be diluted with a solvent, and particularly an environmentally friendly solvent, prior to application to the fuser substrate. Alternative methods, however, can be used for coating layers, including methods described in Copending application U.S. Ser. No. 09/069,476, filed Apr. 29, 1998, entitled "Method of Coating Fuser Members," the disclosure of which is totally incorporated herein by reference.

The cured fluoroelastomer layer is situated on the substrate (or any underlying intermediate layers) in any desired or suitable thickness, typically from about 5 to about 30 microns, preferably from about 5 to about 25 microns, and more preferably from about 10 to about 20 microns, although the thickness can be outside of these ranges.

Other optional layers, such as adhesive layers or other suitable cushion layers or conductive layers, can also be incorporated between the outer elastomer layer and the substrate. Optional intermediate adhesive layers and/or polymer layers can be applied to achieve desired properties and performance objectives. An adhesive intermediate layer can be selected from, for example, epoxy resins and polysiloxanes. Preferred adhesives include materials such as Union Carbide A-1100, Dow TACTIX 740, Dow TACTIX 741, Dow TACTIX 742, Dow Corning P5200, Dow Corning S-2260, Union Carbide A-1100, and United Chemical Technologies A0728. A particularly preferred curative for the aforementioned adhesives is Dow H41. Preferred adhesive(s) for silicone adhesion are A4040 silane, available from Dow Corning Corp., Midland, Mich. 48686, D.C. 1200, also available from Dow Corning, and S-11 silane, available from Grace Specialty Polymers, Lexington, Mass. Adhesion of fluorocarbon elastomers can be accomplished with Chemlok® 5150, available from Lord Corp., Coating and Lamination Division, Erie, Pa.

Polymeric fluid release agents can optionally be used in combination with the polymer outer layer to form a layer of fluid release agent which results in an interfacial barrier at the surface of the fuser member while leaving a non-reacted low surface energy release fluid as an outer release film. Suitable release agents include both functional and non-functional fluid release agents. The term "nonfunctional oil" as used herein refers to oils which do not react chemically with the fillers on the surface of the fuser member. The term "functional oil" as used herein refers to a release agent having functional groups which react chemically with the fillers present on the surface of the fuser member so as to reduce the surface energy of the fillers and thereby provide better release of toner particles from the surface of the fuser member. Non-functional release agents include known polydimethyl siloxane release agents. Functional release agents such as amino functional, mercapto functional, hydride functional, and others, can also be used. Specific examples of suitable amino functional release agents include T-Type amino functional silicone release agents, as disclosed in, for example U.S. Pat. No. 5,516,361, monoamino functional silicone release agents, as described in, for example U.S. Pat. No. 5,531,813, and amino functional siloxane release agents, as disclosed in, for example, U.S. Pat. No. 5,512,409, the disclosures of each of which are totally incorporated herein by reference. Examples of mercapto functional release agents include those disclosed in, for example, U.S. Pat. Nos. 4,029,827, 4,029,827, and 5,395,725, the disclosures of each of which are totally incorporated herein by reference. Examples of hydride functional oils include those disclosed in, for example, U.S. Pat. No. 5,401,570, the disclosure of which is totally incorporated herein by reference. Other functional release agents include those described in, for example, U.S. Pat. Nos. 4,101,686, 4,146,659, and 4,185,140, the disclosures of each of which are totally incorporated herein by reference. Other release agents include those described in, for example, U.S. Pat. Nos. 4,515,884 and 5,493,376, the disclosures of each of which are totally incorporated herein by reference.

Preferred polymeric fluid release agents to be used in combination with the polymeric layer are those comprising molecules having functional groups which interact with any filler particles in the fuser member and also interact with the polymer itself in such a manner as to form a layer of fluid release agent that results in an interfacial barrier at the surface of the fuser member while leaving a non-reacted low surface energy release fluid as an outer release film. Suitable release agents include polydimethylsiloxane fusing oils having amino, mercapto, and other functionality for fluoroelastomer compositions. For silicone based compositions, a nonfunctional oil can also be used. The release agent can further comprise nonfunctional oil as a diluent.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Solutions containing methyl ethyl ketone, a fluoroelastomer (VITON® GF, obtained from E. I. DuPont de Nemours & Co., Wilmington, Del.) and the additional ingredients listed in the table below (ingredients listed in units of parts by weight) were prepared by stirring the ingredients (except for the curatives) overnight to dissolve the polymer. The oxides were pre-ground and dispersed in methyl isobutyl ketone prior to being added to the solutions. About 10 to 30 minutes prior to coating, the curatives (VC-50, a bisphenol A based curing system with an accelerator, available from E. I. DuPont de Nemours & Co., Wilmington, Del., or DC 6040, an epoxy silane curative, available from Dow Corning Co., Midland, Mich.) were added to the solutions (with the VC-50 being predissolved in methyl ethyl ketone). The fluoroelastomer solutions were spray coated onto a TEFLON® sheet wrapped around a substrate. The films thus prepared were air dried, followed by heat curing for 22 hours at 400° F. and peeling away of the cured polymers from the TEFLON® as free standing films. In each instance wherein the solutions contained oxides, the oxides were a mixture of magnesium oxide, present in an amount of 2 parts by weight per 100 parts by weight of the polymer, and calcium hydroxide, present in an amount of about 1 part by weight per 100 parts by weight of the polymer.

| Solution | VITON® GF | MEK | Oxides | VC-50 | DC6040 |
|---|---|---|---|---|---|
| A | 10 | 90 | no | — | — |
| B | 10 | 90 | yes | — | — |
| C | 10 | 90 | yes | 5 | — |
| D | 10 | 90 | yes | — | 2 |
| E | 10 | 90 | yes | — | 5 |
| F | 10 | 90 | yes | — | 10 |
| G | 10 | 90 | no | — | 10 |

Thereafter, various physical properties of the films thus prepared were tested by Instron testing as per ASTM F219. Tensile strength was measured in inch pounds per cubic inch (in-#/in$^3$), toughness was measured in pounds per cubic inch, initial modulus was measured in pounds per square inch, and percent strain at maximum load is a percentage figure. In a plot of stress (force divided by area; psi) versus strain (measured in terms of length change: $\Delta L/L_{initial}$), the maximum load (measured in pounds) is the load at which the film breaks, the tensile strength is the point on the curve at which the material breaks (stress obtained at the highest applied force), the initial modulus is the slope of the initial stress-strain curve, the toughness is the area under the stress-strain curve, and the percent strain at maximum load is the percent change in length of the test sample at the breaking point.

| Film | Tensile Strength | % strain @ max. load | Toughness | Initial Modulus |
|---|---|---|---|---|
| A | 1170 | 926 | 3714 | 375 |
| B | 1873 | 1020 | 5423 | 414 |
| C | 1278 | 826 | 3447 | 438 |
| D | 1492 | 1066 | 5235 | 412 |
| E | 1293 | 1065 | 4759 | 409 |
| F | 1128 | 982 | 4088 | 395 |
| G | 1176 | 878 | 6774 | 842 |

As the data indicate, the films cured with the epoxy silane curative exhibited equivalent heat stability and improved toughness compared to the films cured with the bisphenol A based curative. A comparison of films "A" and "C" to film "G" indicates that the addition of the DC Z-6040 improved the mechanical properties of the film. Film "C" is typical of known standard materials with the known curative and particulate oxide acid acceptor additives, whereas film "G" is illustrative of the instant invention, using only solution or liquid based additives. The curing process of the present invention is simpler than known processes, in that no particulate fillers are required and no grinding is required. The polymer was also more easily dissolved in the solvent with the solutions of the present invention. As a comparison of films "D", "E", "F", and "G" indicates, increasing amounts of crosslinking curative increase the crosslink density of the material, thereby increasing brittleness of the cured polymer. In addition, it is believed that since the compositions of the present invention are more reactive than known compositions, less energy is required to drive the crosslinking reaction. The adhesive properties of the curative also render the use of additional adhesives between the cured fluoroelastomer layer and the substrate optional.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A fuser member comprising a substrate and at least one outer fusing layer thereover, said outer fusing layer comprising a crosslinked product of a composition which consists essentially of (a) one or more fluoroelastomers, (b) one or more epoxy silane curatives, (c) a solvent, (d) one or more optional acid acceptors, and (e) one or more optional adjuvants and/or fillers.

2. A fuser member according to claim 1 wherein the fluoroelastomer is a copolymer of vinylidenefluoride and hexafluoropropylene, a terpolymer of vinylidenefluoride, hexafluoropropylene and tetrafluoroethylene, a tetrapolymer of vinylidenefluoride, hexafluoropropylene, tetrafluoroethylene and a cure site monomer, or a mixture thereof.

3. A fuser member according to claim 1 wherein the epoxy silane curative is of the formula

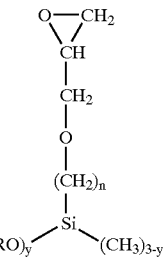

wherein y is an integer of 0, 1, 2, or 3, n is an integer representing the number of repeat —(CH$_2$)— units, and R is an alkyl group.

4. A fuser member according to claim 1 wherein the epoxy silane curative is glycidoxypropyl trimethoxysilane, glycidoxypropyl dimethylethoxysilane, or (3-glycidoxypropyl) methyldiethoxysilane.

5. A fuser member according to claim 1 wherein the epoxy silane curative and the fluoroelastomer are present in relative amounts, prior to curing, of from about 0.5 parts by weight curative per 100 parts by weight fluoroelastomer to about 15 parts by weight curative per 100 parts by weight fluoroelastomer.

6. A fuser member according to claim 1 wherein the layer comprises a crosslinked product of a composition which comprises (a) a fluoroelastomer, (b) an epoxy silane curative, and (c) an acid acceptor.

7. A fuser member according to claim 6 wherein the acid acceptor is magnesium oxide, calcium hydroxide, lead oxide, copper (III) oxide, zinc oxide, or mixtures thereof.

8. A fuser member according to claim 6 wherein the acid acceptor and the fluoroelastomer are present in relative amounts, prior to curing, of from about 2 parts by weight acid acceptor per 100 parts by weight fluoroelastomer to about 20 parts by weight acid acceptor per 100 parts by weight fluoroelastomer.

9. A fuser member according to claim 1 wherein the crosslinked product is obtained by heating the composition to a temperature of from about 200 to about 400° F.

10. A fuser member according to claim 1 wherein the crosslinked product is obtained by heating the composition for from about 10 to about 24 hours.

11. A fuser member according to claim 1 wherein the crosslinked product is present on the substrate in a thickness of from about 5 to about 30 microns.

12. A process which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member according to claim 1.

13. An image forming apparatus for forming images on a recording medium which comprises: (i) a charge-retentive surface capable of receiving an electrostatic latent image thereon; (ii) a development assembly to apply toner to the charge-retentive surface, thereby developing the electrostatic latent image to form a developed image on the charge retentive surface; (iii) a transfer assembly to transfer the developed image from the charge retentive surface to a copy substrate; and (iv) a fixing assembly to fuse toner images to a surface of the copy substrate, wherein the fixing assembly includes a fuser member according to claim 1.

14. A fuser member according to claim 1 wherein the optional adjuvants and/or fillers are selected from the group consisting of coloring agents, reinforcing fillers, processing aids, accelerators, oxides, hydroxides, proton acids, carbon black, graphite, metals, silicone particles, fumed silicas, clays, metal alloys, metal salts, alumina, and mixtures thereof.

15. A fuser member according to claim 1 containing no metal oxides.

16. A fuser member according to claim 1 containing no metal oxides and no metal hydroxides.

17. A fuser member comprising a substrate and at least one outer fusing layer thereover, said outer fusing layer comprising a crosslinked product of a composition which consists of (a) one or more fluoroelastomers, (b) one or more epoxy silane curatives, (c) a solvent, (d) one or more optional acid acceptors, and (e) one or more optional adjuvants and/or fillers.

18. A fuser member according to claim 17 wherein the fluoroelastomer is a copolymer of vinylidenefluoride and hexafluoropropylene, a terpolymer of vinylidenefluoride, hexafluoropropylene and tetrafluoroethylene, a tetrapolymer of vinylidenefluoride, hexafluoropropylene, tetrafluoroethylene and a cure site monomer, or a mixture thereof.

19. A fuser member according to claim 17 wherein the epoxy silane curative is of the formula

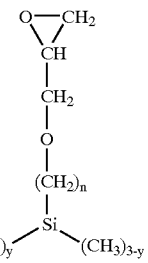

wherein y is an integer of 0, 1, 2, or 3, n is an integer representing the number of repeat —($CH_2$)— units, and R is an alkyl group.

20. A fuser member according to claim 17 wherein the epoxy silane curative is glycidoxypropyl trimethoxysilane, glycidoxypropyl dimethylethoxysilane, or (3-glycidoxypropyl) methyldiethoxysilane.

21. A fuser member according to claim 17 wherein the layer comprises a crosslinked product of a composition which comprises (a) a fluoroelastomer, (b) an epoxy silane curative, and (c) an acid acceptor.

22. A fuser member according to claim 21 wherein the acid acceptor is magnesium oxide, calcium hydroxide, lead oxide, copper (III) oxide, zinc oxide, or mixtures thereof.

23. A process which comprises (i) generating an electrostatic latent image on an imaging member; (ii) developing the latent image by contacting the imaging member with a developer; (iii) transferring the developed image to a copy substrate; and (iv) affixing the developed image to the copy substrate by contacting the developed image with a fuser member according to claim 17.

24. An image forming apparatus for forming images on a recording medium which comprises: (i) a charge-retentive surface capable of receiving an electrostatic latent image thereon; (ii) a development assembly to apply toner to the charge-retentive surface, thereby developing the electrostatic latent image to form a developed image on the charge retentive surface; (iii) a transfer assembly to transfer the developed image from the charge retentive surface to a copy substrate; and (iv) a fixing assembly to fuse toner images to a surface of the copy substrate, wherein the fixing assembly includes a fuser member according to claim 17.

25. A fuser member according to claim 17 wherein the optional adjuvants and/or fillers are selected from the group consisting of coloring agents, reinforcing fillers, processing aids, accelerators, oxides, hydroxides, proton acids, carbon black, graphite, metals, silicone particles, fumed silicas, clays, metal alloys, metal salts, alumina, and mixtures thereof.

26. A fuser member according to claim 17 containing no metal oxides.

27. A fuser member according to claim 17 containing no metal oxides and no metal hydroxides.

* * * * *